No. 891,677. PATENTED JUNE 23, 1908.
O. DIEFFENBACH.
MANUFACTURE OF ALUMINATES.
APPLICATION FILED JUNE 30, 1906.
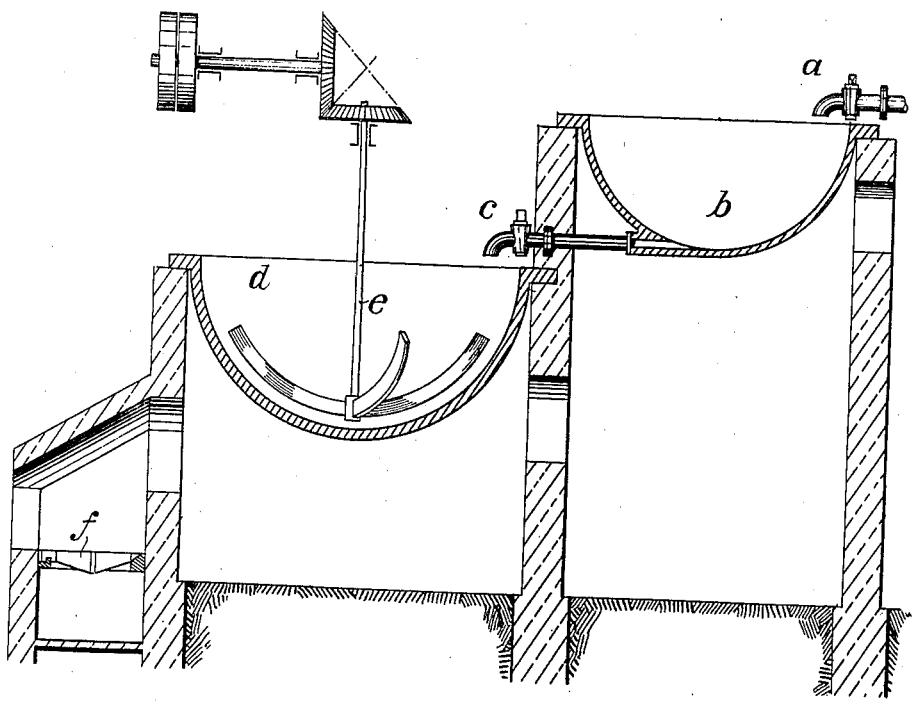

UNITED STATES PATENT OFFICE.

OTTO DIEFFENBACH, OF GRIESHEIM, GERMANY, ASSIGNOR TO CHEMISCHE FABRIK GRIESHEIM ELECTRON, OF FRANKFORT-ON-THE-MAIN, GERMANY.

MANUFACTURE OF ALUMINATES.

No. 891,677.     Specification of Letters Patent.     Patented June 23, 1908.

Application filed June 30, 1906. Serial No. 324,265.

*To all whom it may concern:*

Be it known that I, OTTO DIEFFENBACH, a subject of the German Emperor, and a resident of Griesheim-on-the-Main, Germany, have invented certain new and useful Improvements in the Manufacture of Aluminates, of which the following is a specification.

In the manufacture of aluminates two industrial processes are generally adopted according to the older of which bauxite and soda are mixed together and calcined in a reverberatory furnace at a white heat for from two to three hours, or, according to some authorities for from four to five hours, 1.2 molecule of $Na_2O$ being used for each molecule of $Al_2O_3$ and $Fe_2O_3$, (see Dammer's *Technologie*, Vol. I, page 622 and *Jurisch Chem. Ind.* 94 page 90). According to the other, and more recent, process (see German Patent No. 65,604, an addition to German Patent No. 43977) the bauxite is decomposed while being stirred, in a boiler under a pressure of from three, to four, atmospheres (or from five, to seven, atmospheres according to some authorities), with caustic soda lye of a specific gravity of 1.45 the time taken being from two, to three, hours, the proportion of $Na_2O$ being, for this operation, from 1.75 to 1.85 molecules to each molecule of $Al_2O_3$, heat being applied by steam (see Borcher's *Elektrometallurgie* 1903 p. 151 and Winteler: *Die Aluminium-Industrie* page 28).

It is obvious that the older process of manufacture of aluminates in a reverberatory furnace is not economical on account of the large consumption of fuel. The second and more recent process, in which bauxite is decomposed in a boiler under pressure by means of alkali lye, has also its drawbacks as it is necessary to use a considerable excess of alkali and it is most difficult, if not impossible, to keep a boiler, provided with a stirring mechanism, tight under pressure when caustic soda lye is employed. Moreover the strong corrosion to which the vessels under pressure are exposed through the action of the caustic soda lye is a constant source of danger.

All the disadvantages attendant upon rendering the bauxite soluble, by the processes hitherto known, are entirely avoided by the process according to this invention, which consists in rendering soluble aluminiferous material (such for instance as bauxite) by means of caustic alkali at atmospheric pressure and at a temperature ranging from 180° to 500° centigrade.

In the accompanying drawing I have illustrated in vertical cross section means by which the process may be carried out.

In said drawing, *a* is a delivery pipe for lyes connected to a storage vessel not shown.

*b* is the heating vessel for the lyes.

*c* is the delivery tube through which the heated lyes are led from the vessel *b* to the vessel *d*.

*d* is the stirring vessel in which the aluminiferous material is rendered soluble.

*e* represents a mechanical stirrer, and *f* is a fire place, the products of combustion being led first to the vessel *d*, and the waste products of combustion passing on to heat the vessel *b* and thence out by the flue indicated.

The process according to this invention can be carried out as follows: The aluminiferous material, which I will presume is bauxite, is heated to a temperature of from 180°, to 200°, centigrade in a vessel exposed to the direct action of fire and preferably provided with a stirring device but the mixing of the mass can be done by hand, or mechanically as may be most convenient. Next to, and above, this first vessel, is another vessel heated by the gases from the first vessel and serving to pre-heat the lye used in the process. From this second vessel as much lye is allowed to run into the first vessel as will form, with the bauxite, a stiff pulp. The temperature in the first vessel, of course, decreases to the boiling point of the added lye. The fire is urged and evaporation is carried on until the temperature of the mixture of bauxite and lye has again risen to about 180° centigrade. Then a further quantity of lye is added which again causes lowering of the temperature and then the fire is again urged, and so on until the required amount of lye has been added. Then, when the material is rendered soluble by means of caustic potash lye, the contents of the vessel are heated further for from half an hour to one hour at a temperature of from 180° to 200° centigrade.

The lye is added in successive portions because if the whole of the lye required for rendering the material soluble were introduced at once the evaporation, occurring at 180° to 200° centigrade, would cause such excessive foaming of the mass that it would boil over the edge of the vessel and, as heating to the aforesaid temperatures is an essential condition for rendering the bauxite perfectly soluble, the addition of pre-heated lye in successive quantities is resorted to and thereby the excessive foaming of the contents of the boiler is avoided.

The method of rendering bauxite soluble when either caustic potash lye, or caustic soda lye, is used is the same, except that, in order to obtain perfect solubility with caustic soda lye, the temperature should be raised to from 350° to 500° centigrade after the whole of the lye has been introduced, whereas when caustic potash lye is used, a temperature of from 180° to 200° centigrade will suffice to render bauxite completely soluble.

The necessity of employing a temperature higher than that required by the pressure process, is practically compensated for by the direct fire heat being used the cost of raising steam being thus saved.

It has been attempted to render bauxite soluble by boiling it with caustic soda lye as explained, for instance, in the *Jahresberichten der Chem. Technologie* of Dr. J. R. Wagner 8th yearly volume for 1862 page 308 and the specification of the German Patent No. 67504. The solubility produced in this manner is however imperfect, the said specification prescribing as a remedy against this a fresh treatment of the residue by means of soda.

Aluminates have been produced by fusing together aluminium oxid and caustic potash (see Dammer's *Handbuch der Anorgan. Chemie* Vol. III, page 11), but hitherto no such perfect solubility of aluminiferous minerals has been obtained at atmospheric pressure with so small an amount of alkali ($Al_2O_3:Na_2O = 1:1.3$) as is the case in accordance with this invention.

It has hitherto been presumed that bauxite must either be opened out by means of alkali lyes under pressure, or that the mixture of bauxite with caustic alkali must be well and thoroughly calcined in order to secure satisfactory solubility (see the statement of Bayers upon the subject in the specification of German Patent No. 43977).

The disadvantages of the pressure process have already been explained. The second or calcination process, has in addition to excessive fuel consumption, the disadvantage that it cannot owing to the high temperature required, be carried out in iron vessels: and that stoneware is decomposed by glowing caustic alkali and aluminate, and thus rapidly destroyed.

The present process of rendering soluble aluminiferous material such as bauxite, at a temperature of from 180° to 500° centigrade by means of caustic alkali has therefore the important advantages that in addition to possessing all the advantages which rendering bauxite soluble under pressure by means of alkali lye presents over the older process in a reverberatory furnace by means of soda, or other caustic alkali, that it can be carried out in iron vessels, and is entirely free from danger and requires less alkali than does the process under pressure and therefore the precipitation of the alumina from the aluminate lye can be effected more rapidly and more thoroughly than hitherto.

Claim:

The herein described process of manufacturing aluminates, which consists in stirring separately aluminiferous material while heating it to a temperature of 180° to 500° centigrade at atmospheric pressure, introducing into the stirred mass first as much caustic alkali as will form with the aluminiferous material a stiff pulp, raising again the temperature of the mass to 180° to 500° centigrade, then adding a further quantity of alkali, raising again the temperature to 180° to 500° centigrade and so on until the required amount of caustic lye has been added, continuing the heating of the mass for some time, lixiviating the molten mass and filtering off the aluminate solution thus obtained, as and for the purpose set forth.

In testimony whereof I have signed my name to this specification in the presence of two subscribing witnesses.

OTTO DIEFFENBACH.

Witnesses:
   FRANZ HASSLACHER,
   ERWIN DIPPEL.